(12) United States Patent
Vries et al.

(10) Patent No.: US 11,154,067 B2
(45) Date of Patent: Oct. 26, 2021

(54) MEMBRANE AND METHOD FOR PRESERVATION OF PRODUCE

(71) Applicants: Agricultural Research Council, Pretoria (ZA); Council For Scientific And Industrial Research, Pretoria (ZA)

(72) Inventors: Filicity Ann Vries, Bellville (ZA); Michel Lonji Kalombo, Faerie Glen (ZA)

(73) Assignees: Council for Scientific and Industrial Research, Pretoria (ZA); Agricultural Research Council, Pretoria (ZA)

( * ) Notice: Subject to any disclaimer, the term of this patent is extended or adjusted under 35 U.S.C. 154(b) by 0 days.

(21) Appl. No.: 15/759,085

(22) PCT Filed: Sep. 9, 2016

(86) PCT No.: PCT/IB2016/055371
§ 371 (c)(1),
(2) Date: Mar. 9, 2018

(87) PCT Pub. No.: WO2017/042719
PCT Pub. Date: Mar. 16, 2017

(65) Prior Publication Data
US 2019/0045804 A1 Feb. 14, 2019

(30) Foreign Application Priority Data

Sep. 11, 2015 (GB) .................................. 1516095

(51) Int. Cl.
*A23B 7/16* (2006.01)
*A01N 25/34* (2006.01)
*A23B 7/148* (2006.01)
*B32B 27/06* (2006.01)
*B32B 27/18* (2006.01)
*A01N 65/44* (2009.01)
*A01N 25/18* (2006.01)
*A23B 7/152* (2006.01)
*B65D 65/42* (2006.01)
*B65D 81/26* (2006.01)

(52) U.S. Cl.
CPC ............. *A23B 7/16* (2013.01); *A01N 25/18* (2013.01); *A01N 25/34* (2013.01); *A01N 65/44* (2013.01); *A23B 7/148* (2013.01); *A23B 7/152* (2013.01); *B32B 27/06* (2013.01); *B32B 27/18* (2013.01); *B65D 65/42* (2013.01); *B65D 81/264* (2013.01); *B32B 2250/03* (2013.01); *B32B 2250/40* (2013.01); *B32B 2307/726* (2013.01); *B32B 2410/00* (2013.01); *B32B 2439/70* (2013.01)

(58) Field of Classification Search
CPC .................................................. B32B 2439/70
See application file for complete search history.

(56) References Cited

U.S. PATENT DOCUMENTS

| | | |
|---|---|---|
| 6,150,004 A | 11/2000 | Oikawa et al. |
| 2004/0034149 A1 | 2/2004 | Garcia |
| 2009/0155328 A1 | 6/2009 | Lee |
| 2012/0273084 A1 | 11/2012 | Belias et al. |
| 2015/0147373 A1 | 5/2015 | Kohla et al. |
| 2016/0030918 A1* | 2/2016 | Kaimoto ............... B01J 20/046 428/315.7 |

FOREIGN PATENT DOCUMENTS

| | | | | |
|---|---|---|---|---|
| EP | 0444917 | | 9/1991 | |
| EP | 2060392 | | 5/2009 | |
| JP | 2008007695 | * | 1/2008 | ........... C09D 201/00 |
| WO | 03039766 | | 5/2003 | |
| WO | 03088747 | | 10/2003 | |
| WO | 2008149232 | | 12/2008 | |
| WO | WO 2014/181880 | * | 11/2014 | ............. B01D 53/26 |

OTHER PUBLICATIONS

Kurek Mia et al, "Effect of relative humidity on carvacrol release and permeation properties of chitosan based films and coatings", Food Chemistry, Jan. 8, 2013, vol. 144, p. 9-17—2014.
International Search Report dated Oct. 26, 2016 for related PCT Patent Application No. PCT/IB2016/055371 which was filed on Sep. 9, 201; 4 pages.

* cited by examiner

*Primary Examiner* — Hasan S Ahmed
(74) *Attorney, Agent, or Firm* — Hovey Williams LLP

(57) ABSTRACT

This invention relates to a membrane and method for the preservation of agricultural produce. According to a first aspect of the invention there is provided a membrane for the preservation of agricultural produce comprising first and second outer polymeric layers, at least one of the outer polymeric layers being impregnated with a hydrophilic agent, and an inner layer dispersed in between the outer layers, the inner layer consisting of a polymer being impregnated with a carrier for incorporation of an antimicrobial volatile into the inner layer, the inner layer further including an absorptive agent, wherein in use, the membrane is placed proximate to agricultural produce to be preserved.

8 Claims, No Drawings

MEMBRANE AND METHOD FOR PRESERVATION OF PRODUCE

RELATED APPLICATIONS

This application is the National Stage of International Patent Application No. PCT/IB2016/055371, filed Sep. 9, 2016, which is hereby incorporated by reference in its entirety, and which claims priority to United Kingdom Patent Application No. 1516095.5, filed Sep. 11, 2015.

INTRODUCTION AND BACKGROUND TO THE INVENTION

This invention relates to a membrane for the preservation of agricultural produce, and more particularly, but not exclusively, to a membrane and method for the postharvest protection of produce against decay.

The deciduous fruit industry, and in particular the pome fruit, stone fruit and table grape industry, is predominantly an export and import orientated industry with a significant annual turnover. The postharvest chain of the deciduous fruit industry, before the produce reaches the consumer, comprises harvesting, handling, packing, transport and storage of the fruit. Decay during the postharvest chain has been identified as a major factor causing postharvest losses which could manifest in significant economic losses during export and import.

Depending on the type of diseases or pathogens, postharvest disease control is normally achieved with suitable treatment applied pre-harvest and/or postharvest by various different mechanisms, including so-called drip treatment or drench treatments.

Consumers however generally prefer purchasing organically cultivated produce that is safe for consumption by being free from treatment with pesticides and fungicides, and also free from defects and disease. To this end, strict regulations regarding the maximum residue limits (MRL) in the edible portion of the produce have been introduced globally, which has a significant effect on import and export markets. Over and above the resistance by consumers to purchase produce treated with pesticides and fungicides, the disposal of large volumes of pesticidal and fungicidal dipping solutions may also detrimentally affect the environment and more particularly soil and water resources, and is an additional reason for this option being undesirable.

In view of the above disadvantages, an alternative solution to postharvest fungicide and pesticide applications is indicated in the fresh produce industry. Among these alternative methods that have been implemented to date are modified or controlled atmospheric environments, and biological control agents.

A known method for achieving some microbial elimination is disclosed in United States patent application number 2002/0041939 (US'939). According to US'939, a sulphur dioxide ($SO_2$) generator comprises two separate sheets being connectable to one another, the arrangement being such that pockets are formed in between the sheets, with a substance, barium sulphate (BaSO4), dispersed in the pockets. Upon release of moisture from the produce via respiration, the barium sulphate is activated and sulphur dioxide is released as a fumigant pesticide and fungicide.

A disadvantage experienced with sulphur dioxide generators such as those described in US'939 is that barium sulphate is a known allergen or irritant, and any perforation of the barium sulphate containing pockets or sheets may cause release of the barium sulphate and exposure of the produce thereto, and inevitably exposure of the consumer, which is undesirable.

United States patent application number 2004/0034149 (US'149) discloses a plastic film having incorporated in the film at least one essential oil. US'149 teaches towards the utilisation of the films as pre-harvest bags, such as banana bags for protecting fruit on the tree, or as harvest films or bags to repel bugs and insects entering the harvesting gathering containers. A further application of the film is in the manufacturing of a postharvest bag to preserve the produce as it travels to market, as liners in boxes or containers for shipping produce, or as sheets that covers produce, and in particular fruits, to protect against insects.

A disadvantage experienced with plastic films, sheets and bags as explained in US'149 is that the sheets do not provide for the moisture released from the fruits by natural respiration to be absorbed or removed, and the accumulated moisture on the surface of the film or interior of the bag creates a favourable environment for pathogens such as fungi and microbes to thrive.

OBJECT OF THE INVENTION

It is accordingly an object of the current invention to provide a membrane and method for the protection of produce during the postharvest chain with which the above disadvantages, and in particular the disadvantages associated with use of pesticides and fungicides, and furthermore to assist in ensuring that the disadvantage of increased exposure of the produce to moisture, could at least partially be overcome or alleviated.

SUMMARY OF THE INVENTION

According to a first aspect of the invention there is provided a membrane for the preservation of agricultural produce comprising:
  first and second outer polymeric layers;
  at least one of the outer polymeric layers being impregnated with a hydrophilic agent for the formation of hydrophilic pockets in at least one of the outer polymeric layers to increase the permeability of the outer polymeric layer impregnated with the hydrophilic agent to moisture; and
  an inner layer dispersed in between the outer layers, the inner layer consisting of a polymer being impregnated with a carrier for incorporation of an antimicrobial volatile into the inner layer, the inner layer further including an absorptive agent,
  wherein in use, the membrane is placed proximate to agricultural produce to be preserved, the arrangement being such that upon release of moisture from the produce due to natural respiration, the moisture passes through the hydrophilic patches in the first and second outer layers toward the inner layer, upon which the moisture is absorbed by the absorptive agent, which causes the temperature of the absorptive agent to increase and in turn activates release of the antimicrobial volatile, thereby facilitating preservation of the produce by elimination of surrounding microbial elements.

Further according to the first aspect of the invention, the antimicrobial volatile may be an essential oil, and may be an essential oil or mixture of essential oils selected from the group consisting of essential oils of lemongrass, peppermint, lemon, lime, citronella, clove bud, thyme, sweet orange, mandarin, lavender, *eucalyptus*, ginger, rosemary, tea tree and the like.

Still further according to the first aspect of the invention, the absorbing agent may be zeolite. The zeolite may comprise a $Na_2O$, $Al_2O_3$ and $SiO_2$ formulation having a molar ratio of 1 $Na_2O$:1 $Al_2O_3$, and the molar ratio between $Na_2O$ and $SiO_2$ may be in the molar range of 1 $Na_2O$:2.6 to 3 $SiO_2$. The zeolite may be in bead or powder form, with beads being the preferred form, and the size of the beads may range between 4-12 mesh, with a pore diameter ranging between 6-12 Å. The zeolite may have an $H_2O$ equivalent capacity ranging between 28 to 30% of total bead weight.

Yet further according to the first aspect of the invention, the carrier may be silica powder, and the hydrophilic agent may be a hydrophilic polymer, and more particular, hydroxylpropyl methyl cellulose. The polymer may be low density polyethylene (LDPE).

Still further according to the first aspect of the invention, the produce may be deciduous fruit, and more particular, any deciduous fruit selected from the group consisting of pome fruit, stone fruit or table grapes. The microbial elements may be fungi or bacteria, and more particular, *Botrytis cinerea, Penicillium expansum* and *Neofabraea alba*.

Yet further according to the first aspect of the invention, wherein the membrane may be used in the manufacture of any item selected from the group consisting of produce bags for containing and transporting produce, or liners or sheets for placement in produce containers.

According to a second aspect of the invention there is provided a method for preservation of produce including the steps of:

impregnating a first polymeric material with a hydrophilic agent to form a first mixture;

impregnating a second polymeric material with a carrier, an absorptive agent and an antimicrobial volatile to form a second mixture;

introducing the first and second mixtures into a film blower;

extruding a three layered membrane from the film blower by way of a co-extrusion process so that the first mixture is extruded into two outer layers with hydrophilic patches therein, and the second mixture is extruded to form an inner layer dispersed in between the outer layers;

placing the three layered membrane proximate to produce to be preserved;

allowing moisture released from the produce to pass through hydrophilic patches in the three layered membrane and be absorbed by the absorption agent of the inner layer;

activation of the absorption agent by the absorption of the moisture, which causes an increase in temperature;

release of the antimicrobial volatile into atmosphere surrounding produce; and preservation of the produce by elimination of surrounding microbial elements.

DESCRIPTION OF A PREFERRED EMBODIMENT OF THE INVENTION

Natural plant protectants, such as essential oils and their major components, show antimicrobial activities, and in particular antifungal activities and low mammalian toxicity and are more environmentally friendly, and therefore could be used as alternatives for chemical fungicides and pesticides. Essential oils are known for being natural antioxidants with documented antimicrobial, in particular antifungal, and biodegradable properties, and do not leave any detrimental residual effect, such as discolouration or aftertaste on fresh produce.

Essential oils and their components are popular alternatives to known produce preservation methods and products due to the volatile nature thereof, which enables the use of relatively small concentrations. Furthermore, consumers are generally more inclined to accept essential oils as preservatives because they are widely used in general culinary practices, including as flavouring agents, and the safety thereof for human consumption has already been established in view of the GRAS (generally recognised as safe) classification thereof by the United States Food and Drug Administration (FDA).

The invention is accordingly focussed on the optimal utilisation of essential oils as an alternative to known methods and products for preservation of produce, and in particular fruit, during the postharvest chain until it reaches the consumer as end user.

The invention aims to achieve this result by incorporation of essential oils into a membrane that can either be utilised in the manufacturing of produce bags, or alternatively as liners or sheets that can be placed in produce containers such as boxes or crates. The membrane accordingly comprises first and second outer layers consisting of a polymer, with at least one of the layers being impregnated with a hydrophilic agent such as hydroxylpropyl methyl cellulose for the formation of hydrophilic pockets in the first and second layers to increase the permeability of the first and second layers to moisture. The membrane further comprises an inner layer dispersed inbetween the outer layers, the inner layer consisting of a low density polyethylene (LDPE) being impregnated with silica, carrying an essential oil into the inner layer, the inner layer further including zeolite.

In use, the membrane is placed in proximity of fruit or other produce to be preserved, the arrangement being such that upon release of moisture from the fruit due to natural respiration, the moisture passes through the hydrophilic patches in at least one of the first and second outer layers toward the inner layer, upon which the moisture is absorbed by the zeolite, which causes a reaction to occur whereby the temperature of the zeolite is increased. The increase in temperature and in turn activates release of the volatile essential oil, which acts as biofumigant and ultimately facilitating preservation of the produce by elimination of surrounding microbial elements.

The preferred form of zeolite is the form thereof commercially known as Molecular sieve 13X zeolite which can be obtained from Sigma Aldrich as supplier under product code 283592 and CAS number 63231-69-6. The 13X zeolite is a $Na_2O$, $Al_2O_3$ and $SiO_2$ formulation having a molar ratio of 1 $Na_2O$:1 $Al_2O_3$, and the molar ratio between $Na_2O$ and $SiO_2$ may be in the molar range of 1 $Na_2O$:2.6 to 3 $SiO_2$. The bead form of 13X zeolite is preferred, and the size of the beads ranges between 4-12 mesh, with a pore diameter ranging between 6-12 Å. The 13X zeolite has a $H_2O$ equivalent capacity ranging between 28 to 30% of total bead weight.

The low density polyethylene (LDPE) multilayered membrane is embedded with a preferred mixture of essential oils taken at different mass ratio and concentrations (i.e. lemongrass and peppermint oils or lemongrass plus lemon oils systems) by means of a co-extrusion process. The mixture of oils is first adsorbed on a silica powder prior to the blending with pulverized LDPE and 13X zeolite. Thereafter the mixture is fed into the hopper of a central extrusion line of a Scientific film blower, while pellets of LDPE blended with a hydrophilic polymer (hydroxylpropyl methyl cellulose) is fed in the outer lines. The temperature of the different extrusion lines is kept at 140° C., and the membrane is pulled at a speed of 5 m/min while maintaining the blowing pressure at 215 kPa. The width of the film produced is 20 cm in average with an average thickness of 75 μm when measured by means of a micrometer.

The outer layers in the membrane provide for the multi-directional release of the antimicrobial volatile essential oils. It is accordingly possible to include a membrane according to the invention in between fruit during the storage and transport phase, with the effect that fruit on both sides of the membrane will be exposed to the volatile essential oils upon release. It is however foreseen that a further embodiment may include a non-permeable layer without hydrophilic patches, which membrane may be placed on either side of the inner membrane to facilitate unidirectional release of volatile essential oils if required.

The essential oil component is any essential oil or a mixture of essential oils selected from the group consisting of essential oils of lemongrass, peppermint, lemon, lime, citronella, clove bud, thyme, sweet orange, mandarin, lavender, *eucalyptus*, ginger, rosemary, tea tree and the like.

It is foreseen by the applicant that the membrane may be used in bag, liner or sheet form in the preservation of most if not all types of fresh agricultural produce, but the specific focus is deciduous fruit, and more particular, any deciduous fruit selected from the group consisting of pome fruit, stone fruit or table grapes for both local, import and export markets.

Due to the fact that the release of the volatile essential oil is facilitated by the absorption of moisture, the antimicrobial effect of the essential oil preservative is prolonged, seeing that the release thereof is controlled. In the absence of moisture, the release of essential oils will decrease, and when moisture, being a catalyst for decay is prevalent, the moisture is absorbed, and the essential oils are released, which limits decay as set out herein.

To this end, the effect of essential oils of lemongrass, lime and lemon oil through thermofogging and dip or drench treatments was tested against *Botrytis cinerea, Penicillium expansum* and *Neofabraea alba* on 'Granny Smith', 'Golden Delicious' and 'Pink Lady' apple varieties. Treated fruit were stored at controlled atmosphere for 28 days followed by 7 days at 20° C. Essential oil mixtures showed the highest inhibition of *B. cinerea, P. expansum* and *N. alba* on all three cultivars in the thermofogging treatment. In case of dip treatment of fruit, fungicides and essential oils provided the best inhibition of *B. cinerea, P. expansum* and *N. alba* on all three cultivars compared to control treatments (water). The results confirm the possibility of using essential oils in combination with controlled atmosphere as natural fumigants for controlling postharvest diseases of apples. Light microscopy studies showed that lemongrass essential oil damages the microbial cytoplasmic membrane, resulting in a clear separation of cytoplasm from the cell wall. The chemical composition of essential oils of lemon, lime and lemongrass were analysed using gas chromatography (GC)-mass spectrometry (MS). The GC-MS spectrometry analysis exhibited 45 components in essential oil of lemon, with limonene (58.52%) and gamma-terpinene (19.80%) as the major compounds. Lime showed 20 components of which limonene (79.00%) and gamma-terpinene (11.22%) were the abundant compounds. Lemongrass revealed 27 components, of which geranial 48.14% and neral 38.32% were the major compounds.

The results obtained during postharvest dip trials of apples treated with single essential oils and essential oil mixtures, indicating the efficacy of essential oils as biofumigant and antimicrobial agent appear in Tables 1 to 3 below.

TABLE 1

Treatment of 'Golden Delicious', 'Pink Lady' and 'Granny Smith' apple varieties against *Botrytis cinerea*, with antimicrobial efficacy indicated as percentage value.
Microbe: *Botrytis cinerea*

|  |  | Apple variety | | |
|---|---|---|---|---|
|  |  | 'Golden Delicious' | 'Pink Lady' | 'Granny Smith' |
| Treatment | Control (water) | 0 | 0 | 0 |
|  | Ethanol | 13.98 | 2.88 | 16.53 |
|  | Lemon | 62.42 | 63.22 | 65.45 |
|  | Lime | 82.79 | 82.44 | 65.93 |
|  | Lemongrass | 87.08 | 81.16 | 68.93 |
|  | Lemon + Lemongrass | 88.26 | 82.78 | 84.01 |
|  | Lime + Lemongrass | 88.54 | 83.17 | 87.17 |

TABLE 2

Treatment of 'Golden Delicious', 'Pink Lady' and 'Granny Smith' apple varieties against *Penicillium expansum*, with antimicrobial efficacy indicated as percentage value.
Microbe: *Penicillium expansum*

|  |  | Apple variety | | |
|---|---|---|---|---|
|  |  | 'Golden Delicious' | 'Pink Lady' | 'Granny Smith' |
| Treatment | Control (water) | 0 | 0 | 0 |
|  | Ethanol | 18.07 | 0.16 | 18.75 |
|  | Lemon | 42.25 | 53.18 | 59.68 |
|  | Lime | 47.59 | 63.55 | 61.51 |
|  | Lemongrass | 60.11 | 69.91 | 70.71 |
|  | Lemon + Lemongrass | 64.07 | 74.74 | 70.95 |
|  | Lime + Lemongrass | 65.02 | 71.72 | 76.93 |

TABLE 3

Treatment of 'Golden Delicious', 'Pink Lady' and 'Granny Smith' apple varieties against *Neofabraea alba*, with antimicrobial efficacy indicated as percentage value.
Microbe: *Neofabraea alba*

|  |  | Apple variety | | |
|---|---|---|---|---|
|  |  | 'Golden Delicious' | 'Pink Lady' | 'Granny Smith' |
| Treatment | Control (water) | 0 | 0 | 0 |
|  | Ethanol | 10.41 | 19.25 | 21.87 |
|  | Lemon | 71.93 | 74.43 | 51.16 |
|  | Lime | 79.51 | 75.77 | 56.37 |
|  | Lemongrass | 80.13 | 75.98 | 56.37 |
|  | Lemon + Lemongrass | 84.92 | 84.25 | 58.94 |
|  | Lime + Lemongrass | 82.69 | 79.88 | 64.77 |

The essential oil mixtures from lemongrass, peppermint and lemon were also tested for activity against *Botrytis cinerea* under in vivo conditions on table grape cultivars 'Victoria' and 'Red Globe' towards the development of a biological control system for the control of *Botrytis* rot of table grapes, by impregnating a membrane with these essential oil mixtures. Non-inoculated and inoculated trials were conducted. Two essential oil blends, namely lemongrass 1.25%+peppermint 1.25% and lemongrass 1.25%+lemon 18.75% loaded at 2 and 5% weight per sheet were used for the trials. The controlled release sheets were used in combination of modified atmosphere packaging (MAP), regular atmosphere (RA) and controlled atmosphere (CA–5% $O_2$+10% $CO_2$).

For the non-inoculated trials, grapes were packed in 4.5 kg box with 5-7 bunches per box. Sixteen treatment combinations were tested, as shown in Table 4 below. Two impregnated sheets were put on top and the bottom of grapes in the boxes and stored either at RA, CA or in Life Span MAP. The inner package material includes a moisture absorption sheet and bunch carry bags. Boxes only with $SO_2$ sheets and without impregnated oil sheets represent the control cartons. Fruit cartons were stored at RA, CA and in Life Span MAP liners for 4 w at –0.5° C. and shelf life of 5 d at 15° C. Upon removal from cold storage cartons of grapes were moved to 15° C. and stored with or without sheets to determine the efficacy on decay development and quality (off-taste). Each bunch was examined for decay and potential off-taste.

TABLE 4

Different mixtures of essential oils utilised and concentrations applied during study.

| Legend | Essential oil blends | Concentrations (%) loaded |
|---|---|---|
| P1C1RA | lemongrass 1.25% + peppermint 1.25% | 2 |
| P1C2RA | lemongrass 1.25% + peppermint 1.25% | 5 |
| P1C1CA | lemongrass 1.25% + peppermint 1.25% | 2 |
| P1C2CA | lemongrass 1.25% + peppermint 1.25% | 5 |
| P1C1MAP | lemongrass 1.25% + peppermint 1.25% | 2 |
| P1C2MAP | lemongrass 1.25% + peppermint 1.25% | 5 |
| P2C1RA | Lemongrass 1.25% + lemon 18.75% | 2 |
| P2C2RA | Lemongrass 1.25% + lemon 18.75% | 5 |
| P2C1CA | Lemongrass 1.25% + lemon 18.75% | 2 |
| P2C2CA | Lemongrass 1.25% + lemon 18.75% | 5 |
| P2C1MAP | Lemongrass 1.25% + lemon 18.75% | 2 |
| P2C2MAP | Lemongrass 1.25% + lemon 18.75% | 5 |
| RA control | | 0 |
| CA control | | 0 |
| MAP control | | 0 |
| $SO_2$ + RA | | 0 |

For the 'Victoria' non-inoculated trial, a combination of both essential oil blends with MAP showed the lowest decay incidence, compared to the standard $SO_2$ treatment. A combination of RA with essential oil blends did not control decay or suppress decay development. Although significant decay control was achieved, results showed that the addition of essential oil blends controlled release sheets to MAP led to moderate-severe off-tastes. A combination of lemongrass and lemon at RA (P2RAC1) significantly reduced incidence of decay during the shelf life period without any off-taste. Although the standard $SO_2$ and CA treatments came out lower in decay control the treatments did not significantly differ from the essential oil blend treatment.

TABLE 5

Effect of two bio products at two concentrations on decay control and eating quality of non-inoculated 'Victoria' table grapes after a storage period of 4 weeks at –0.5° C. and subjected to a shelf life of 5 days at 15° C.

| Treatment | Decay (%) | Off-taste |
|---|---|---|
| P1C1RA | 6.85 | Slight to moderate |
| P1C2RA | 13.71 | Slight |

TABLE 5-continued

Effect of two bio products at two concentrations on decay control and eating quality of non-inoculated 'Victoria' table grapes after a storage period of 4 weeks at –0.5° C. and subjected to a shelf life of 5 days at 15° C.

| Treatment | Decay (%) | Off-taste |
|---|---|---|
| P1C1CA | 5.31 | Slight to moderate |
| P1C2CA | 6.13 | Slight |
| P1C1MAP | 0.41 | Moderate to severe |
| P1C2MAP | 1.23 | Moderate to severe |
| P2C1RA | 11.50 | Unaffected |
| P2C2RA | 13.62 | Slight |
| P2C1CA | 3.96 | Slight |
| P2C2CA | 4.68 | Slight to moderate |
| P2C1MAP | 0.29 | Moderate |
| P2C2MAP | 0.22 | Moderate to severe |
| RA control | 24.20 | Unaffected |
| CA control | 4.50 | Unaffected |
| MAP control | 0.38 | Unaffected |
| $SO_2$ + RA | 7.77 | Unaffected |

For the 'Red Globe' non-inoculated trials, a blend of lemongrass and peppermint with MAP or CA and lemongrass and lemon at both concentrations (2 or 5%) with MAP or CA significantly reduced fungal development compared to the $SO_2$ treatment. However, after tasting the grapes, persistence of their characteristic aroma was detected. It was noted that more essential oil blends either at 2 or 5% in combination with either CA or RA resulted in significant reduction of decay development compared to the standard $SO_2$ treatment without causing any off-taste.

TABLE 6

Effect of two bio products at two concentrations on decay control and eating quality of non-inoculated 'Red Globe' table grapes after a storage period of 4 weeks at –0.5° C. and subjected to a shelf life of 5 days at 15° C.

| Treatment | Decay (%) | Off-taste |
|---|---|---|
| P1C1RA | 4.43 | Slight to moderate |
| P1C2RA | 3.47 | Slight |
| P1C1CA | 1.87 | Moderate |
| P1C2CA | 1.50 | Unaffected |
| P1C1MAP | 0.85 | Moderate to severe |
| P1C2MAP | 1.53 | Slight |
| P2C1RA | 3.09 | Unaffected |
| P2C2RA | 1.01 | Unaffected |
| P2C1CA | 4.02 | Unaffected |
| P2C2CA | 2.60 | Unaffected |
| P2C1MAP | 0.90 | Moderate |
| P2C2MAP | 3.96 | Moderate |
| RA control | 3.80 | Unaffected |
| CA control | 1.05 | Unaffected |
| MAP control | 1.19 | Unaffected |
| $SO_2$ + RA | 8.22 | Unaffected |

For the inoculated grape trials, fruit were disinfected with ethanol (70%) and sodium hypochlorite (0.2%) for 2 min, air-dried and thereafter wounded (3×1 mm) with a sterile needle. Wounded fruit were sprayed with pathogen spore suspension ($10^4$ cfu mL$^{-1}$) and left to dry to initiate infection. The pathogen were sprayed on bunches surface via a compressor for 10-15 min. Bunches were packed in 4.5 kg box with 5-7 bunches. Sixteen treatment combinations were tested. Impregnated sheets were put on top and the bottom of grapes in the boxes and stored either at RA, CA or in Life Span MAP. The inner package material includes a moisture absorption sheet and bunch carry bags. Boxes only with $SO_2$ sheets and without impregnated oil sheets represent the control cartons. Fruit cartons were stored at RA, CA and in Life Span MAP liners for 4 w at −0.5° C. and shelf life of 5 d at 15° C. Upon removal from cold storage cartons of grapes were moved to 15° C. and stored with or without sheets to determine the efficacy on decay development and off-taste. Each bunch of the inoculated grapes was examined for decay and potential off-taste.

For the 'Victoria' inoculated trial, a combination of essential oil blends with MAP significantly inhibited fungal development compared to the other treatments. The addition of essential oil blends to packaging (MAP) led to off-taste. Essential oil blends (lemongrass and lemon at 2/5%) tested in combination with RA resulted in significant reduction fungal decay development compared to $SO_2$ treatment without causing any off-taste.

TABLE 7

Effect of two bio products at two concentrations on decay control and eating quality of inoculated 'Victoria' table grapes after a storage period of 4 weeks at −0.5° C. and subjected to a shelf life of 5 days at 15° C.

| Treatment | Decay (%) | Off-taste |
|---|---|---|
| P1C1RA | 15.35 | Moderate |
| P1C2RA | 17.65 | Moderate to severe |
| P1C1CA | 7.69 | Slight to moderate |
| P1C2CA | 8.80 | Slight to moderate |
| P1C1MAP | 7.59 | Moderate to severe |
| P1C2MAP | 5.54 | Moderate to severe |
| P2C1RA | 23.51 | Unaffected |
| P2C2RA | 22.85 | Unaffected |
| P2C1CA | 10.57 | Slight to moderate |
| P2C2CA | 15.41 | Moderate to severe |
| P2C1MAP | 3.48 | Moderate to severe |
| P2C2MAP | 1.30 | Moderate to severe |
| RA control | 35.36 | Unaffected |
| CA control | 6.97 | Unaffected |
| MAP control | 0.96 | Unaffected |
| $SO_2$ + RA | 10.75 | Unaffected |

For the 'Red Globe' inoculated trials, a blend of lemongrass and peppermint at 2% and lemongrass and lemon at 2 or 5% in combination with either CA or MAP significantly inhibited decay development compared with $SO_2$ treatment. Although the treatments showed the lowest incidence of decay, they cause moderate off-taste. Furthermore a combination of lemongrass and peppermint at 5% with CA, lemongrass and lemon at 2% with CA, lemongrass and lemon at 5% with MAP and lemongrass and lemon at 5% with CA resulted in significant decay reduction without causing any off taste on grapes.

TABLE 8

Effect of two bio products at two concentrations on decay control and eating quality of inoculated 'Red Globe' table grapes after a storage period of 4 weeks at −0.5° C. and subjected to a shelf life of 5 days at 15° C.

| Treatment | Decay (%) | Off-taste |
|---|---|---|
| P1C1RA | 2.37 | Slight to moderate |
| P1C2RA | 10.28 | Unaffected |
| P1C1CA | 4.59 | Slight |
| P1C2CA | 1.63 | Unaffected |
| P1C1MAP | 4.86 | Moderate |
| P1C2MAP | 4.33 | Unaffected |
| P2C1RA | 11.46 | Unaffected |
| P2C2RA | 12.50 | Unaffected |
| P2C1CA | 3.60 | Unaffected |
| P2C2CA | 5.32 | Unaffected |
| P2C1MAP | 2.81 | Moderate |
| P2C2MAP | 3.96 | Slight to moderate |

TABLE 8-continued

Effect of two bio products at two concentrations on decay control and eating quality of inoculated 'Red Globe' table grapes after a storage period of 4 weeks at −0.5° C. and subjected to a shelf life of 5 days at 15° C.

| Treatment | Decay (%) | Off-taste |
|---|---|---|
| RA control | 17.78 | Unaffected |
| CA control | 6.08 | Unaffected |
| MAP control | 4.08 | Unaffected |
| $SO_2$ + RA | 6.65 | Unaffected |

The best treatments for 'Victoria' and 'Red Globe' were also compared, and a blend of lemongrass and lemon at 2% with RA in the non-inoculated trials for both cultivars performed the best in terms of reduction of fungal development without causing any off-taste. A blend of lemongrass and lemon at 2 or 5% with RA in the inoculated trial resulted in the significant reduction of decay for both cultivars without causing any off taste. The results of the study showed that more essential oil blends were effective on 'Red Globe' cultivar compared to the 'Victoria' cultivar. The exact antifungal mechanism(s) action of essential oils against fungi is not clarified yet it might be due to their most abundant components especially phenolic compounds. Phenolic components available in essential oils that have lipophilic character act in cell wall and interfere in action of membrane catalysed enzymes and enzymes responsible for energy and protein production and, as a result cause cell death.

The invention also provides for a method for preservation of produce, which commences by the impregnation of a batch of low density polyethylene (LDPE) with a hydrophilic agent such as hydroxylpropyl methyl cellulose to form a first mixture, and the impregnation of a second batch of LDPE with a carrier in the form of silica, an antimicrobial volatile in the form of an essential oil and an absorptive agent such as zeolite, and preferably commercially available 13X zeolite, to form a second mixture. The first and second mixtures are introduced into a film blower, and a three layered membrane is extruded from the film blower by way of a co-extrusion process so that the first mixture is extruded into two outer layers with hydrophilic patches therein, and the second mixture is extruded to form an inner layer dispersed inbetween the outer layers. Produce is preserved in accordance with this method by placing the three layered membrane in proximity to produce to be preserved, and allowing moisture released from the produce to pass through hydrophilic patches in the three layered membrane and be absorbed by the zeolite located in the inner layer. The zeolite is activated by the absorption of the moisture, which causes an increase in temperature in the zeolite, which in turn facilitates release of the antimicrobial essential oils into the atmosphere surrounding produce, which eliminates surrounding microbial elements.

The antifungal activity of essential oils during the vapour phase recognises the application of essential oils as biofumigant to control the postharvest diseases in fruit that cannot be subjected to aqueous sanitation in the packing line or elsewhere in the postharvest chain.

It is accordingly asserted that the disadvantages presented by known treatments and methods for the preservation of produce may at least partially be overcome by the membrane and method according to the invention.

In particular, the disadvantage of having to use and dispose of potentially hazardous pesticides, fungicides or other chemicals in the preservation of produce is overcome by providing a viable and cost effective organic alternative.

Furthermore, the disadvantages posed by US'939 is also being overcome by the invention teaching away from the use of substances such as barium sulphate, which is a known allergen, and instead providing a more viable organic solution.

The disadvantage of formation of moisture in the vicinity of the produce to be preserved, which in effect facilitates accelerated decay of produce, as presented in US'149, is overcome by the membrane and method according to the invention providing an avenue for the absorption of additional moisture.

It will be appreciated that in terms of the invention, variations in details are possible without departing from the scope of the appended claims.

The invention claimed is:

1. A membrane for the preservation of agricultural produce comprising:
   first and second outer polymeric layers;
   at least one of the outer polymeric layers impregnated with a hydrophilic agent for the formation of hydrophilic pockets in at least one of the outer polymeric layers to increase the permeability of the outer polymeric layer impregnated with the hydrophilic agent to moisture; and
   an inner layer dispersed in between the outer layers, the inner layer consisting of a polymer being impregnated with a carrier for incorporation of an antimicrobial volatile in the form of an essential oil blend comprising of 1.25 wt. % lemongrass and 18.75 wt. % lemon, the inner layer further including an absorptive agent, wherein the absorptive agent is a zeolite,
   wherein the membrane comprises an arrangement such that upon release of moisture from the produce in the vicinity of the membrane due to natural respiration, the moisture passes through the hydrophilic pockets towards the inner layer, upon which the moisture is absorbed by the absorptive agent, which causes the temperature of the absorptive agent to increase and in turn activates release of the antimicrobial volatile, thereby facilitating preservation of the produce by elimination of surrounding microbial elements.

2. The membrane for the preservation of agricultural produce according to claim 1, wherein the zeolite comprises a molecular sieve 13X zeolite.

3. The membrane for the preservation of agricultural produce according to claim 1, wherein the carrier is silica powder.

4. The membrane for the preservation of agricultural produce according to claim 3, wherein the hydrophilic agent is hydroxypropyl methyl cellulose.

5. The membrane for the preservation of agricultural produce according to claim 1, wherein the agricultural produce is any deciduous fruit selected from the group consisting of pome fruit, stone fruit or table grapes.

6. The membrane for the preservation of agricultural produce according to claim 1, wherein the membrane is used in the manufacture of any item selected from the group consisting of produce bags for containing and transporting produce, or liners or sheets for placement in produce containers.

7. The membrane for the preservation of agricultural produce according to claim 1, wherein the microbial elements comprise fungi or bacteria.

8. The membrane for the preservation of agricultural produce according to claim 7, wherein the fungi or the bacteria comprise *Botrytis cinerea, Penicillium expansum* and *Neofabraea alba*.

* * * * *